United States Patent
Hayashi

(10) Patent No.: US 11,293,781 B2
(45) Date of Patent: Apr. 5, 2022

(54) ENCODER AND ENCODER CONTROL SYSTEM

(71) Applicant: Fanuc Corporation, Yamanashi (JP)

(72) Inventor: Shinichirou Hayashi, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 207 days.

(21) Appl. No.: 16/579,166

(22) Filed: Sep. 23, 2019

(65) Prior Publication Data
US 2020/0096365 A1    Mar. 26, 2020

(30) Foreign Application Priority Data
Sep. 25, 2018    (JP) .............................. JP2018-179344

(51) Int. Cl.
*G01D 5/00*    (2006.01)

(52) U.S. Cl.
CPC ..................... *G01D 5/00* (2013.01)

(58) Field of Classification Search
CPC ...... G01D 5/00; G01D 18/001; G01D 18/008; G01D 3/125; G01D 3/12; G01D 5/244; G01D 5/24476; G01D 5/249; H02P 9/00; H02P 9/02; H02P 9/025
USPC ........................................................ 702/151
See application file for complete search history.

(56) References Cited

U.S. PATENT DOCUMENTS

| | | | |
|---|---|---|---|
| 5,721,546 A | 2/1998 | Tsutsumishita | |
| 6,639,529 B1 * | 10/2003 | Jansson | G01D 5/2449 341/120 |
| 10,072,950 B2 | 9/2018 | Okada | |
| 2014/0299754 A1 * | 10/2014 | Okada | G01B 11/26 250/231.1 |

FOREIGN PATENT DOCUMENTS

| | | |
|---|---|---|
| JP | 08261794 A | 10/1996 |
| JP | 10301630 A | 11/1998 |
| JP | 2002341943 A | 11/2002 |
| JP | 2003329485 A | 11/2003 |
| JP | 2013-090567 A | 5/2013 |
| JP | 2014202568 A | 10/2014 |
| JP | 2016038347 A | 3/2016 |

* cited by examiner

Primary Examiner — Michael P Nghiem
Assistant Examiner — Dacthang P Ngo
(74) Attorney, Agent, or Firm — RatnerPrestia

(57) ABSTRACT

An encoder according to an example of the present disclosure includes a first reception unit configured to receive a position information request signal for requesting position information on an object to be detected, a position information generation unit configured to generate the position information at a position information generation timing after a predetermined delay time elapses from when the position information request signal is received, and a first transmission unit configured to transmit the position information to the outside via serial communication. The first transmission unit is configured to transmit, at least once, position information generation timing information representing the predetermined delay time to the outside via serial communication.

5 Claims, 6 Drawing Sheets

ENCODER AND ENCODER CONTROL SYSTEM

CROSS-REFERENCE TO RELATED APPLICATIONS

This application is a new U.S. Patent Application that claims benefit of Japanese Patent Application No. 2018-179344, dated Sep. 25, 2018, the disclosure of this application is being incorporated herein by reference in its entirety for all purposes.

BACKGROUND OF THE INVENTION

1. Field of the Invention

The present invention relates to an encoder and an encoder control system.

2. Description of the Related Art

In an encoder control system that performs serial communication, the encoder receives a signal requesting position information on the control system from a control device and places and communicates position information generated at a certain timing on serial data. It takes a certain time from a time when the encoder receives the position information request signal to a time when the control device receives the position information as serial data, and the position information is updated because an object to be detected has moved during this certain time.

To address this change in position information, the control device estimates position information at the time of receiving the position information from the operating condition and the communication timing and corrects the estimated position information, which can improve the accuracy of control (e.g., JP 2013-90567 A).

However, in a case that one encoder is selected from a plurality of types of encoders and used, since the position information generation timing of the encoder is different for each encoder, there is a problem that the correction amount needs to be adjusted for each encoder.

SUMMARY OF THE INVENTION

An object of the present invention is to provide an encoder and an encoder control system that can obtain position information generation timing information for correcting optimally position data in a case that the type of encoder is changed and that allow an operation for inputting position information generation timing information to be omitted.

An encoder according to an example of the present disclosure includes a first reception unit configured to receive a position information request signal for requesting position information on an object to be detected, a position information generation unit configured to generate the position information at a position information generation timing after a predetermined delay time elapses from when the position information request signal is received, and a first transmission unit configured to transmit the position information to the outside via serial communication. The first transmission unit is configured to transmit, at least once, position information generation timing information representing the predetermined delay time to the outside via serial communication.

An encoder control system according to an example of the present disclosure is a control system including an encoder and a control device. The encoder and the control device are communicatively connected. The encoder includes a first reception unit configured to receive a position information request signal for requesting position information of an object to be detected, a position information generation unit configured to generate the position information at a position information generation timing after a predetermined delay time elapses from when the position information request signal is received, and a first transmission unit configured to transmit the position information to the outside via serial communication. The first transmission unit is configured to transmit, at least once, position information generation timing information representing the predetermined delay time to the outside via serial communication. The control device includes a second transmission unit configured to transmit the position information request signal, a second reception unit configured to receive the position information generation timing information representing the predetermined delay time and the position information, and a correction unit configured to correct the position information received by the second reception unit on the basis of the position information and the predetermined delay time.

According to the encoder and the encoder control system according to examples of the present disclosure, position information generation timing information for correcting optimally the position data can be obtained even in a case that the type of the encoder is changed, and an operation for inputting the position information generation timing information can be omitted.

DETAILED DESCRIPTION

Hereinafter, an encoder and an encoder control system according to the present invention will be described with reference to the drawings. However, it should be noted that the technical scope of the present invention is not limited to those embodiments, but extends to the invention described in the claims and the equivalents thereof.

Figure 1:
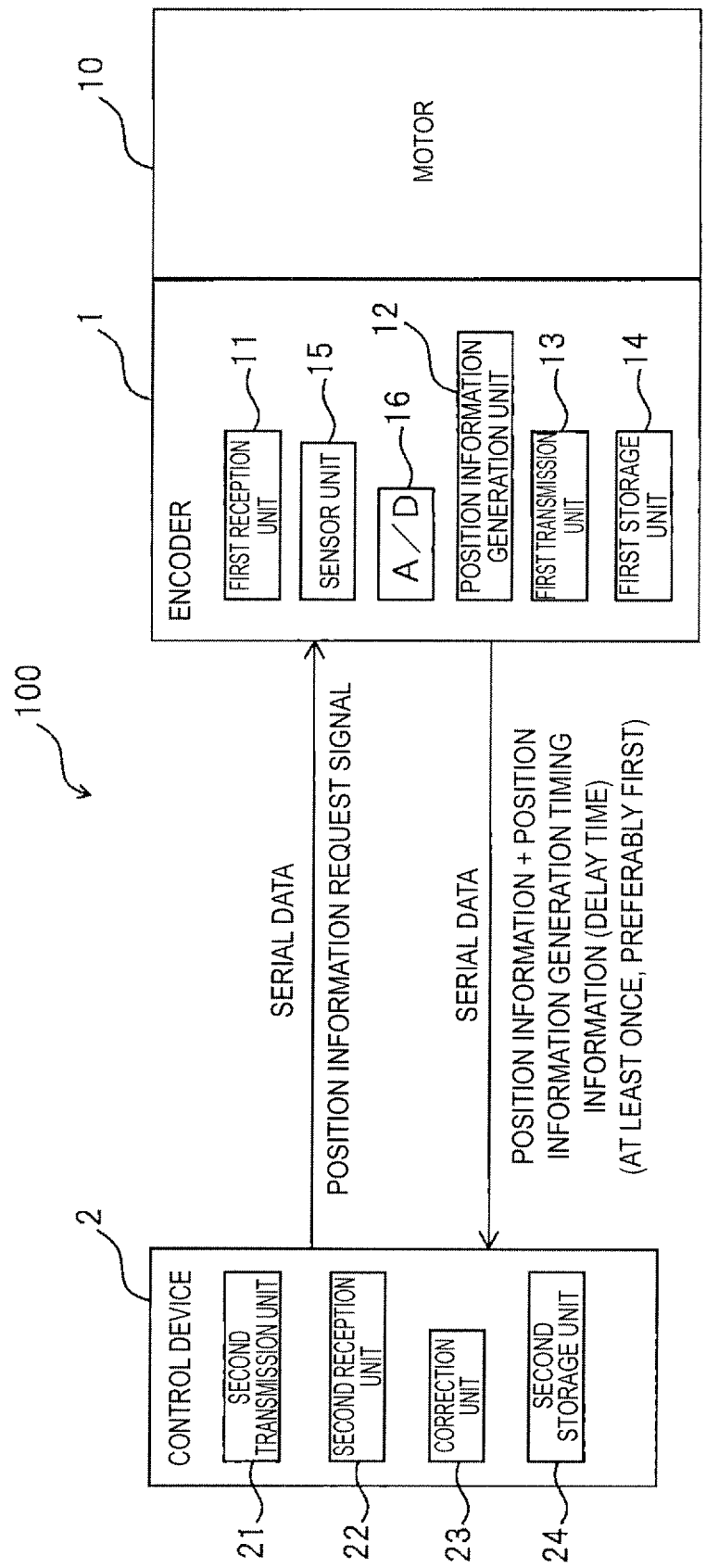
FIG. 1 is a configuration diagram of an encoder control system according to an example.

FIG. 1 illustrates a configuration diagram of an encoder control system (hereinafter, also simply referred to as "control system") according to an example. A control system 100 includes an encoder 1 and a control device 2 connected via serial communication.

The encoder 1 includes a first reception unit 11, a position information generation unit 12, a first transmission unit 13, a first storage unit 14, a sensor unit 15, and an analog/digital (A/D) converter 16. The encoder 1 is provided in the vicinity of a motor 10 that is an object to be detected and detects a position and a movement speed of a rotating shaft (not illustrated) of the motor 10.

The sensor unit 15 detects movement of the rotating shaft of the motor 10 and outputs an analog signal corresponding to the movement distance of the rotating shaft. The A/D converter 16 performs A/D conversion on the analog signal output from the sensor unit 15 and outputs a digital signal.

The control device 2 includes a second transmission unit 21, a second reception unit 22, a correction unit 23, and a second storage unit 24.

Figure 2:
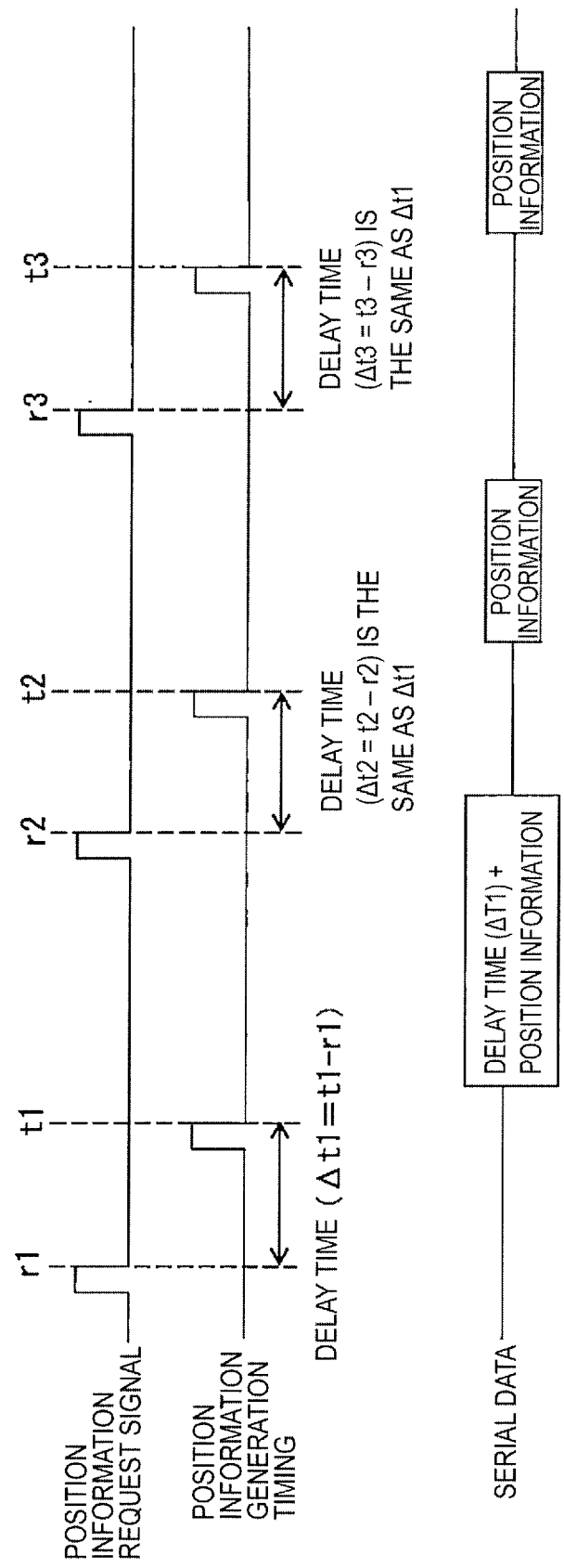
FIG. 2 is a timing chart of a position information request signal and a position information generation timing in an encoder control system according to an example.

The first reception unit 11 receives a position information request signal for requesting position information on the object to be detected. In the example illustrated in FIG. 1, the first reception unit 11 of the encoder 1 receives the position information request signal transmitted from the second transmission unit 21 of the control device 2. FIG. 2 is a timing chart of a position information request signal and a position information generation timing in an encoder control system according to an example. For example, the time at which the first reception unit 11 receives the position information request signal can be set at the time r1, r2, r3 of the falling edge of the pulse of the position information request signal.

The position information generation unit 12 generates position information at a position information generation timing after a predetermined delay time elapses from when the position information request signal is received. In the example illustrated in FIG. 1, the position information generation unit 12 generates the position information on the object to be detected on the basis of the digital signal output from the A/D converter 16. The first storage unit 14 stores position information and position information generation timing information.

The first transmission unit 13 transmits the position information to the outside via serial communication. Moreover, the first transmission unit 13 transmits the position information generation timing information representing a predetermined delay time to the outside via serial communication at least once. In the example illustrated in FIG. 1, the position information and the position information generation timing information transmitted by the first transmission unit 13 are received by the second reception unit 22 of the control device 2. It is noted that the various units of the encoder and the control device are implemented by one or more processors.

In FIG. 2, for example, in a case that the first reception unit 11 receives a first position information request signal at a time r1, the position information generation unit 12 generates position information at a time t1 after a predetermined delay time $\Delta t1$ (=t1−r1). Similarly, in a case that the first reception unit 11 receives a second position information request signal at a time r2, the position information generation unit 12 generates position information at a time t2 after a predetermined delay time $\Delta t2$ (=t2−r2), and in a case that the first reception unit 11 receives a third position information request signal at a time r3, the position information generation unit 12 generates position information at a time t3 after a predetermined delay time $\Delta t3$ (=t3−r3). Hereinafter, similarly, in a case that the first reception unit 11 receives the n-th position information request signal at the time rn (where n is an integer), the position information generation unit 12 generates position information at the time tn after a predetermined delay time $\Delta tn$ (=tn−rn). At this time, it is preferable that each of the delay times $\Delta t1$, $\Delta t2$, $\Delta t3$, . . . , $\Delta tn$ be constant. In a case that the delay time is constant, the delay time $\Delta t1$ transmitted first by the first transmission unit 13 of the encoder 1 to the control device 2 is stored in the second storage unit 24 of the control device 2, so that the first transmission unit 13 does not need to transmit the information on the delay time (position information generation timing information) to the control device 2 for the second time and thereafter. In this manner, the first transmission unit 13 may output the position information generation timing information only once after the first reception unit 11 receives the position information request signal.

Figure 3:
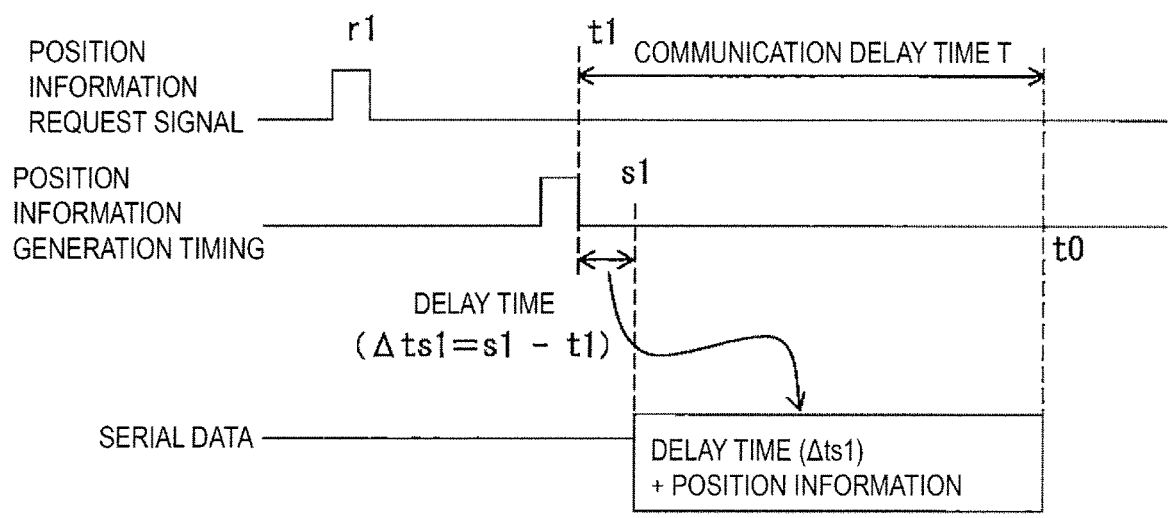
FIG. 3 is a timing chart of a position information request signal and a position information generation timing in an encoder control system according to a modified example.

In the above example, as illustrated in FIG. 2, an example is given in which the position information generation unit 12 generates the position information at the time t1, which is the position information generation timing after a predetermined delay time $\Delta t1$ elapses from when the position information request signal is received at the time r1. In other words, the length of the delay time $\Delta t1$ is determined on the basis of the time r1 at which the position information request signal has been received. However, the disclosure is not limited to these examples. FIG. 3 is a timing chart of the position information request signal and the position information generation timing in the encoder control system according to the modified example. As illustrated in FIG. 3, the serial data may be transmitted after a predetermined delay time $\Delta ts1$ (=s1−t1) from the time t1 at which the position information has been generated, on the basis of a start time s1 of the serial data transmission.

In FIG. 3, in a case that the second reception unit 22 of the control device 2 has completed the reception of the serial data at the time t0, the communication delay time T is t0−t1. Additionally, the transmission period of the serial data is from time s1 to t0. Then, the communication delay time T can be obtained by the following equation.

$$T=t0-t1=t0-s1+\Delta ts1$$

Figure 4A:
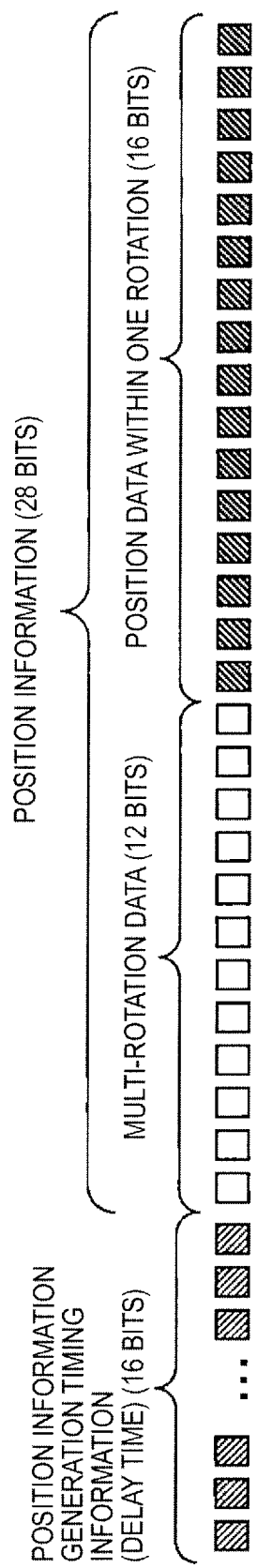
FIG. 4A is a diagram illustrating an example of a data configuration of a position information generation timing information and a position information in an encoder control system according to an example.
Figure 4B:
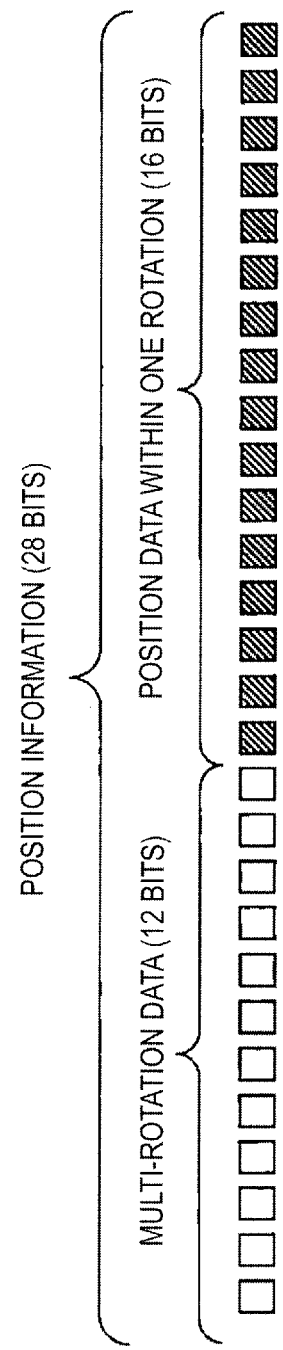
FIG. 4B is a diagram illustrating an example of a data configuration of a position information in an encoder control system according to an example.

FIG. 4A illustrates an example of a data configuration of a position information generation timing information and a position information in an encoder control system according to an example. Further, FIG. 4B illustrates an example of a data configuration of a position information in an encoder control system according to an example. An example in which 12-bit multi-rotation data and 16-bit position data within one rotation are transmitted via serial communication as position information will be described. As illustrated in FIG. 4A, for example, 16-bit position information generation timing information is transmitted via serial communication, the information is transmitted in addition to the 28-bit position information as serial data. On the other hand, in a case that the position information is transmitted for the second time and thereafter, only the position information may be transmitted without addition of the position information generation timing information.

The second reception unit 22 of the control device 2 receives the position information generation timing information representing a predetermined delay time and the position information. However, as described above, the second storage unit 24 may store the position information generation timing information initially received by the second reception unit 22, so that only the position information may be received for the second time and thereafter.

The correction unit 23 of the control device 2 corrects the position information received by the second reception unit 22 on the basis of the position information and the predetermined delay time. This is because the object to be detected moves during a period from when the position information generation unit 12 of the encoder 1 generates a position information to when the second reception unit 22 receives the position information.

Figure 5:
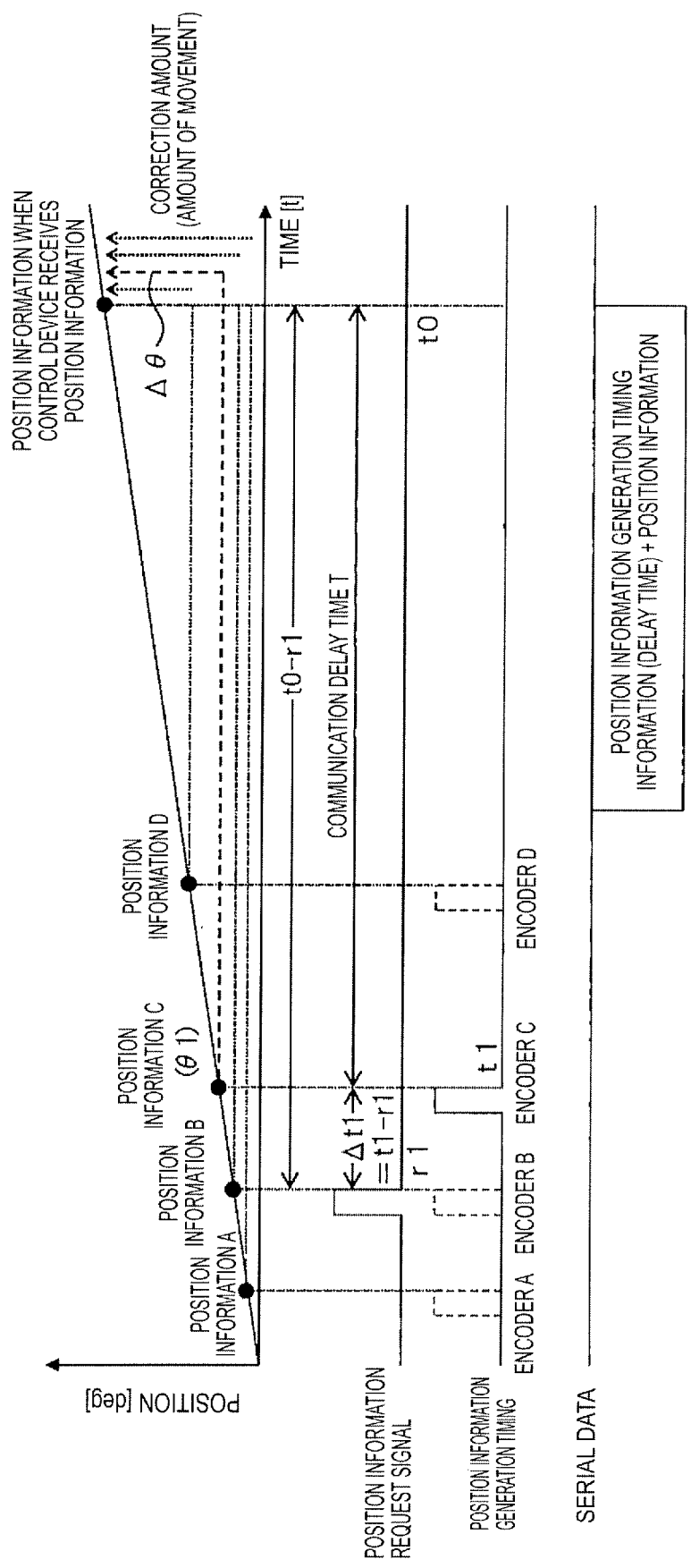
FIG. 5 is a diagram illustrating a relationship between a communication delay time and a correction amount in an encoder control system according to an example.

FIG. 5 illustrates a relationship between the communication delay time and the correction amount in the encoder control system according to an example. The correction unit 23 calculates a communication delay time, which is a difference between a period (t0−r1), from the time r1 when the second transmission unit 21 transmits the position information request signal to the time t0 when the second reception unit 22 receives the position information, and a predetermined delay time (Δt1=t1−r1). That is, in a case that the communication delay time is T, T is determined by the following equation:

$$T=t0-r1-\Delta t1$$

Here, the time r1 is a time at which the control device 2 transmits a position information request signal to the encoder 1 and can be stored in the second storage unit 24 of the control device 2. Moreover, the time t0 is a time at which the control device 2 calculates the correction amount and can be stored in the second storage unit 24 of the control device 2. Additionally, the delay time Δt1 can be stored in the second storage unit 24 of the control device 2 because the second reception unit 22 of the control device 2 receives it from the encoder 1 as position information generation timing information.

The correction unit 23 can correct the position information from the product of the communication delay time T and the movement speed v of the object to be detected. For example, assuming that the position of the object to be detected at the time $t_n$ is $p_n$ and the position of the object to be detected at the time $t_{n+1}$ is $p_{n+1}$, the movement speed v is determined by the following equation.

$$v=(p_{n+1}-p_n)/(t_{n+1}-t_n)$$

Thus, as in the following equation, the correction amount Δθ is determined by the product of the movement speed v and the communication delay time T.

$$\Delta\theta=v\times T$$

Therefore, in a case that the position generated at the time t1, which is the position information generation timing, is θ1, the position θ at the time t0 when the control device 2 receives the position information is determined by the following equation as a value obtained by adding the correction amount Δθ to the position θ1 detected by the sensor unit 15.

$$\theta=\theta1+\Delta\theta$$

As illustrated in FIG. 5, the delay time which is the time from the reception of the position information request signal to the generation of the position information differs depending on the type of encoder (e.g., encoders A, B, C, D, or the like). In the related art, the delay time needs to be set according to the type of the encoder, but the encoder according to the example of the present disclosure outputs the position information generation timing information to the outside, so that the operation of setting the delay time according to the type of the encoder can be omitted.

The invention claimed is:

1. An encoder comprising:
a receiver configured to receive, via serial communication, from a device external to the encoder, a position information request signal requesting position information on an object to be detected;
a processor configured to generate the position information at a position information generation timing after a predetermined delay time elapses from when the position information request signal is received; and
a transmitter configured to:
transmit the position information as position data to the outside via serial communication, and
transmit, at least once, position information generation timing information as timing data indicating the predetermined delay time to the device external to the encoder via serial communication.

2. The encoder of claim 1, further comprising:
a memory device configured to store the position information generation timing information.

3. The encoder of claim 1,
wherein the transmitter is further configured to output the position information generation timing information only once after receiving the position information request signal.

4. An encoder control system comprising:
an encoder; and
a control device external to the encoder, the encoder and the control device being communicatively connected,
wherein the encoder is configured to:
receive, via serial communication, from the control device external to the encoder, a position information request signal for requesting position information on an object to be detected,
generate the position information at a position information generation timing after a predetermined delay time elapses from when the position information request signal is received, and
transmit the position information to the control device external to the encoder via serial communication,
transmit, at least once, position information generation timing information as timing data indicating the predetermined delay time to the control device external to the encoder via serial communication, and
the control device is configured to:
receive, via serial communication, the position information generation timing information as the timing data indicating the predetermined delay time and the position information, and
correct the position information received on the basis of the position information and the predetermined delay time.

5. The encoder control system of claim 4,
wherein the control device is configured to calculate a communication delay time, which is a difference between a period, from when the position information request signal is transmitted to when the position information is received, and the predetermined delay time, and is configured to correct the position information on the basis of the product of the communication delay time and a movement speed of the object to be detected.

* * * * *